US012655897B2

(12) United States Patent
Moore et al.

(10) Patent No.: US 12,655,897 B2
(45) Date of Patent: Jun. 16, 2026

(54) VENTING FOR UNIT CONTAINING ROTATING COMPONENTS AND FLUID

(71) Applicant: Canoo Technologies Inc., Torrance, CA (US)

(72) Inventors: Matthew Jackson Moore, Oklahoma City, OK (US); Abel Ardis, Austin, TX (US); Peter Kim, Gardena, CA (US); Leandro Peres de Oliveira, Redondo Beach, CA (US); Scott Kostohryz, Torrance, CA (US); Jhon Echeverri, Redondo Beach, CA (US); Chad Rumgay, Torrance, CA (US)

(73) Assignee: WHS ENERGY SOLUTIONS, LLC, Argyle, TX (US)

( * ) Notice: Subject to any disclaimer, the term of this patent is extended or adjusted under 35 U.S.C. 154(b) by 0 days.

(21) Appl. No.: 18/679,322

(22) Filed: May 30, 2024

(65) Prior Publication Data

US 2025/0369507 A1     Dec. 4, 2025

(51) Int. Cl.
F16H 57/02      (2012.01)
F16H 57/027     (2012.01)

(52) U.S. Cl.
CPC ................................. F16H 57/027 (2013.01)

(58) Field of Classification Search
CPC ...... F16H 57/02; F16H 57/021; F16H 57/027; F16H 57/029; F16H 57/0457
See application file for complete search history.

(56) References Cited

U.S. PATENT DOCUMENTS

| | | | | |
|---|---|---|---|---|
| 1,639,670 | A * | 8/1927 | Rydner | F16K 24/04 |
| | | | | 55/516 |
| 3,145,582 | A * | 8/1964 | Wagner | F16H 57/027 |
| | | | | 74/606 R |
| 5,891,223 | A * | 4/1999 | Shaw | B01D 53/0415 |
| | | | | 55/482 |
| 7,484,893 | B2 * | 2/2009 | Kitaoka | F16H 57/043 |
| | | | | 384/473 |
| 9,593,762 | B2 * | 3/2017 | Lenczewski | B60K 23/08 |
| 11,913,536 | B2 * | 2/2024 | Dillon | F16K 17/18 |
| 11,920,669 | B2 * | 3/2024 | Li | F16H 57/0457 |

(Continued)

FOREIGN PATENT DOCUMENTS

| | | | | | |
|---|---|---|---|---|---|
| CN | 103671842 | A * | 3/2014 | | E01C 19/28 |
| CN | 105134922 | A * | 12/2015 | | F16H 57/04 |

(Continued)

OTHER PUBLICATIONS

Machine translation of CN 112161027 A obtained on Aug. 7, 2025.*

(Continued)

*Primary Examiner* — Adam D Rogers

(74) *Attorney, Agent, or Firm* — ALLEN, DYER, DOPPELT, + GILCHRIST, P.A.

(57)     ABSTRACT

A venting structure for a housing containing rotating components and fluid, such as a vehicle drive unit, includes a vent receptacle that opens to an exterior of the housing. A venting duct integrally formed in a wall of a main cavity for the housing is connected at a first end to a bottom of the vent receptacle and at a second end to a portion of the main cavity that is above fluid within the main cavity for orientations between and including the housing being upright and the housing being inverted.

14 Claims, 7 Drawing Sheets

(56)            References Cited

U.S. PATENT DOCUMENTS

| | | | | |
|---|---|---|---|---|
| 2014/0349802 | A1* | 11/2014 | Steiner | F16C 33/6637 |
| | | | | 384/462 |
| 2015/0159697 | A1* | 6/2015 | Fischer | F16C 33/664 |
| | | | | 428/156 |
| 2020/0318727 | A1* | 10/2020 | Ege | F16H 57/0461 |
| 2022/0289312 | A1* | 9/2022 | Aquila | B62D 25/105 |

FOREIGN PATENT DOCUMENTS

| | | | | | |
|---|---|---|---|---|---|
| CN | 109322984 | A | * | 2/2019 | F16H 57/0456 |
| CN | 110061588 | A | * | 7/2019 | H02K 7/10 |
| CN | 110735914 | A | * | 1/2020 | F16H 57/027 |
| CN | 111623109 | A | * | 9/2020 | F16H 57/029 |
| CN | 112161027 | A | * | 1/2021 | F16H 57/027 |
| CN | 113007325 | A | * | 6/2021 | F16H 1/28 |
| CN | 118669513 | A | * | 9/2024 | F16H 57/023 |
| CN | 119222308 | A | * | 12/2024 | F16H 57/021 |
| DE | 1907846 | A1 | * | 9/1970 | |
| DE | 19833536 | A1 | * | 1/2000 | F16H 57/0483 |
| DE | 19945897 | A1 | * | 4/2000 | F16H 57/0483 |

OTHER PUBLICATIONS

Machine translation of CN 113007325 A obtained on Aug. 7, 2025.*
Machine translation of CN 110061588 A obtained on Aug. 7, 2025.*
Machine translation of DE 19833536 A1 obtained on Aug. 7, 2025.*
Wikipedia page for Labyrinth Seal; https://en.wikipedia.org/wiki/Labyrinth_seal.*
Dustin Waller, "Protecting Powertrain Components: How Venting Has Improved," Technical Article, Donaldson Filtration Solutions, Feb. 2020, 9 pages.

* cited by examiner

--PRIOR ART--

--PRIOR ART--

--PRIOR ART--

VENTING FOR UNIT CONTAINING ROTATING COMPONENTS AND FLUID

TECHNICAL FIELD

This disclosure relates generally to vehicles. More specifically, this disclosure relates to a system and method for venting in a vehicle transmission.

BACKGROUND

Venting is an integral feature of drive unit housing design in vehicles, used to reduce the effects of expanding and contracting air and ensure a pressure balance between the inside and outside of the drive unit housing. While modern vent components are effective at allowing gases to permeate therethrough, if saturated with fluid, the vent effectiveness degrades rapidly.

Moreover, during assembly onto the chassis, drive units are often flipped upside down, which can saturate the vent membrane. If the drive unit needs to be flipped during assembly, plugs are often placed and then, at a later assembly station, replaced with the vent. This precaution against permeation membrane saturation adds a plug component and step to the assembly process, ultimately increasing cost, time, and exposure of the drive unit interior to external contaminants.

Alternative venting designs (to that of a vent component with a membrane) include breather boxes and strategically designed openings without a membrane. These designs often have indirect paths in and out of the main housing opening, thus creating a longer path for particles and fluid to travel to either enter or escape the housing. Often this design is dependent on orientation relative to gravity, which makes inverting the drive unit during assembly onto the vehicle chassis difficult.

SUMMARY

The present disclosure provides a system and method for improved venting in a vehicle transmission.

In one embodiment, a venting structure includes a vent receptacle that opens to an exterior of a housing containing rotating components and fluid. The venting structure also includes a venting duct integrally formed in a wall of a main cavity for the housing. A first end of the venting duct is connected to a bottom of the vent receptacle. A second end of the venting duct is connected to a portion of the main cavity that is above fluid within the main cavity for orientations between and including the housing being upright and the housing being inverted.

In one embodiment, a method of venting a housing containing rotating components and fluid includes providing a vent receptacle that opens to an exterior of the housing. The method also includes connecting a first end of a venting duct to a bottom of the vent receptacle. The venting duct is integrally formed in a wall of a main cavity for the housing. A second end of the venting duct is connected to a portion of the main cavity that is above fluid within the main cavity for orientations between and including the housing being upright and the housing being inverted.

In some embodiments, the second end of the venting duct may be connected to a recessed area at an end of a bearing bore.

In some embodiments, the recessed area at the end of the bearing bore may be recessed relative to a depth of the bearing bore.

In some embodiments, drain cutouts between the recessed area at the end of the bearing bore and the main cavity may be provided to drain fluid from the recessed area at the end of the bearing bore back into the main cavity.

In some embodiments, the venting duct and the recessed area at the end of the bearing bore may form a labyrinth seal between the vent receptacle and the main cavity.

In some embodiments, a level of the fluid within the main cavity may be below the bearing bore for orientations between and including the housing being upright and the housing being inverted.

In some embodiments, a vent plug is installed within the vent receptacle, and the vent plug may include a membrane through which air permeates to equalize pressure between the main cavity and the exterior of the housing.

In some embodiments, the vent plug may be screwed or pressed into the vent receptacle. In some embodiments, the vent plug may include openings covered by the membrane.

In some embodiments, a vehicle including the venting structure may include the housing mounted on a chassis for the vehicle. Wheels rotatably may be mounted to the chassis. A cabin may be mounted on the chassis.

BRIEF DESCRIPTION OF THE DRAWINGS

For a more complete understanding of this disclosure and its advantages, reference is now made to the following description taken in conjunction with the accompanying drawings, in which like reference numerals represent like parts.

DETAILED DESCRIPTION

FIGS. 1-2 and 4A through 4C, described below, and the various embodiments used to describe the principles of this disclosure are by way of illustration only and should not be construed in any way to limit the scope of this disclosure. Those skilled in the art will understand that the principles of this disclosure may be implemented in any type of suitably arranged device or system.

Figure 1:
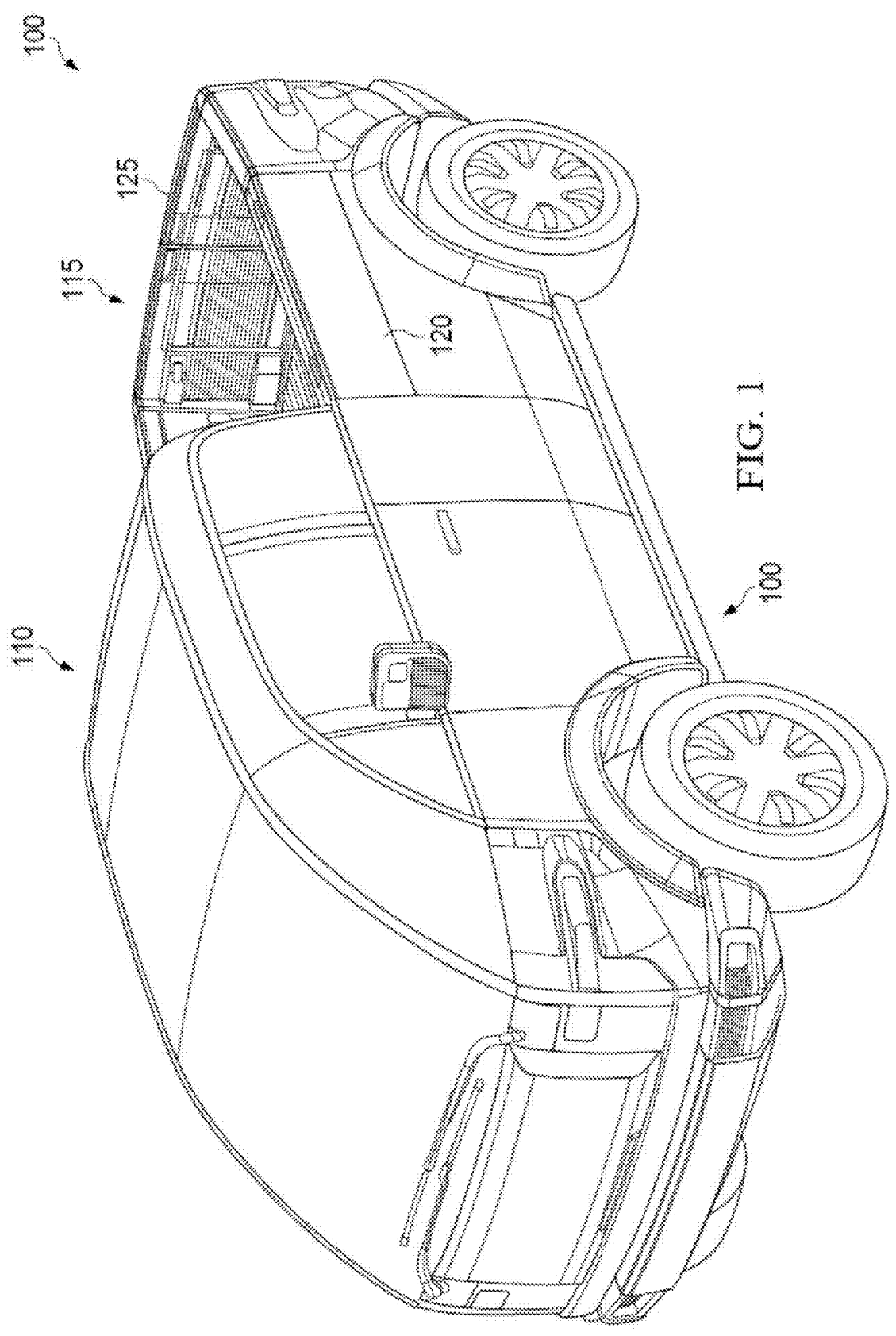
FIG. 1 illustrates an example electric vehicle within which drive unit venting may be implemented according to embodiments of the present disclosure.

FIG. 1 illustrates an example electric vehicle within which drive unit venting may be implemented according to embodiments of the present disclosure. The embodiment of the vehicle 100 illustrated in FIG. 1 is for illustration and explanation only. FIG. 1 does not limit the scope of this disclosure to any particular implementation of a vehicle.

In the example illustrated in FIG. 1, the vehicle 100 includes a top hat structure coupled to an electric vehicle platform. The platform of vehicle 100 of FIG. 1 includes a chassis (not visible in FIG. 1) supporting a cabin 110 for carrying passengers. In some embodiments, the chassis of the vehicle 100 is in the form of a "skateboard" vehicle platform supporting one or more energy storage elements (such as batteries) that provide input electrical power used by various components of the EV, such as one or more electric motors of the vehicle 100 and a control system of the vehicle 100 described in further detail below. The top hat structure is designed and dimensioned to have a crew cabin ("cab") 110 and a cargo bed 115. The cabin 110 is configured to provide a space for one or more persons to sit and either operate or ride in the vehicle. The cargo bed 115 comprises an open area enclosed by a rear surface of the crew cab 110, side panels 120, and a rear gate 125.

Passengers may enter and exit the cabin 110 through at least one door forming part of the cabin 110. A transparent windshield and other transparent panels mounted within and forming part of the cabin 110 allow at least one passenger (referred to as the "operator," even when the vehicle 100 is operating in an advanced driving or "AD" mode) to see outside the cabin 110. Rear-view mirrors mounted to sides of the cabin 110 enable the operator to see objects to the sides and rear of the cabin 110 and may include warning indicators (such as selectively illuminated warning lights) for features such as blind spot warning (indicating that another vehicle is in the operator's blind spot) and/or lane departure warning.

The cabin 110 is preferably dimensioned to accommodate a vehicle operator and at least one passenger. For example, the cabin 110 can be configured with a driver seat and passenger seat. The cabin 110 can include interior lighting and climate control systems, such as articulating, heated or cooled seats, and air vents coupled to an external source, a cabin heater, and an air condition unit. In certain embodiments, the cabin 110 includes a number of device holders, such as recesses to accommodate a beverage and recesses to accommodate one or more electronic devices. In certain embodiments, one or more of the surfaces or configured to attach various modular components. For example, one or more of the lateral surfaces may include a peg-board grid, webbing, picatinny rails, magnetic, electro-magnetic, hook and loop fasteners, and the like.

In certain embodiments one or more of the cabin 110 or cargo bed 115 includes one or more electrical outlets. The electrical outlets can be 110 volts or 220 volts. For example, a first electrical outlet can be 110 volts while a second electrical outlet is 220 volts. Conventional automobile features such as headlamps, taillights, turn signal indicators, windshield wipers, and bumpers are also depicted. The vehicle 100 may further include cargo storage within or connected to the cabin 110 and mounted on the chassis, and the cargo storage area(s) may optionally be partitioned by dividers from the passenger area(s) of the cabin 110.

The platform, which described in further detail below in connection with FIG. 2, includes a chassis for the top hat structure including the cabin 110 and cargo bed 115. Wheels mounted on axles that are supported by the chassis and driven by the motor(s) via drive gears (all not visible in FIG. 1) allow the vehicle 100 to move smoothly. The wheels are mounted on the axles in a manner permitting rotation relative to a longitudinal centerline of the vehicle 100 for steering and are also connected to steering controls (not visible).

Although FIG. 1 illustrates one example of a vehicle 100, those skilled in the art will recognize that the full structure and operation of a suitable vehicle are not depicted in the drawings or described here. Instead, for simplicity and clarity, only the structures and operations necessary for an understanding the present disclosure are depicted and described. Various changes may be made to the example of FIG. 1, and the features described in this disclosure may be used with any other suitable vehicle.

Figure 2:
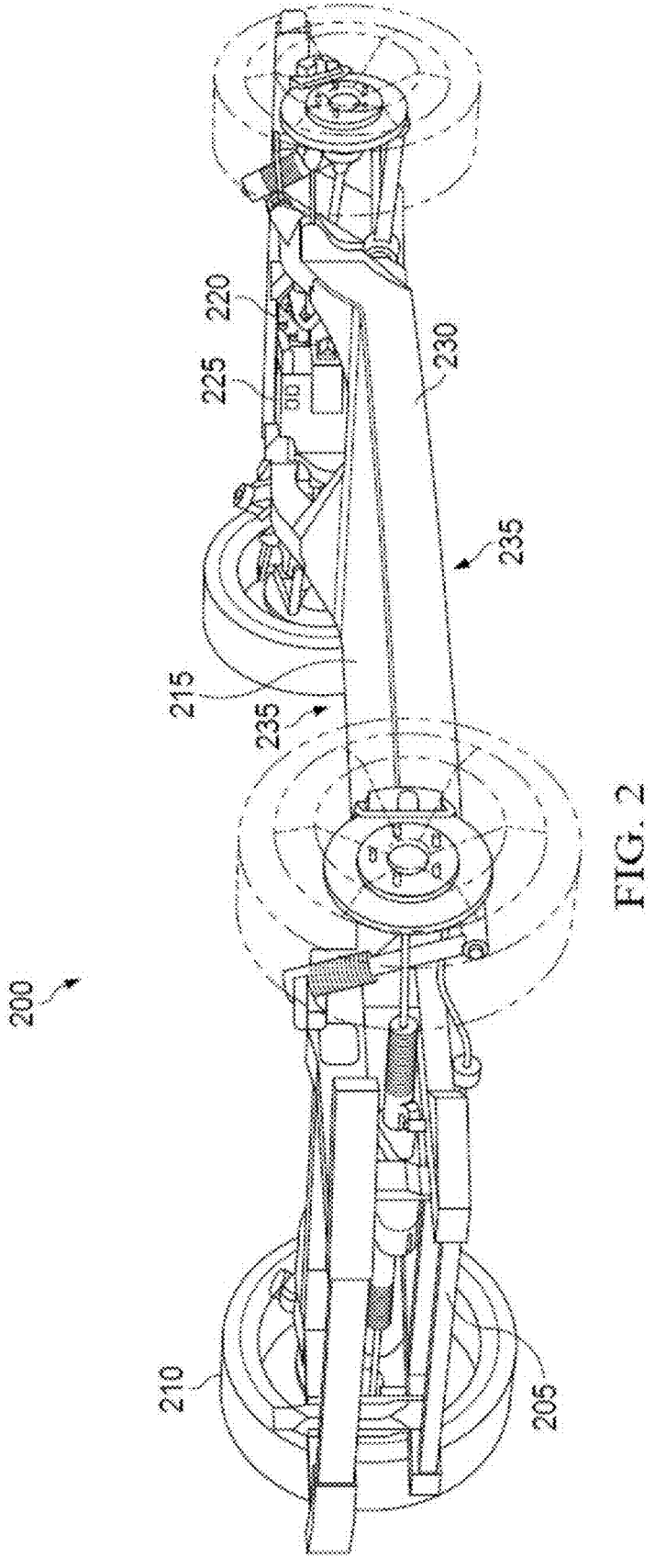
FIG. 2 illustrates an example vehicle platform for an electric vehicle within which drive unit venting may be implemented according to embodiments of the present disclosure.

FIG. 2 illustrates an example vehicle platform for an electric vehicle within which drive unit venting may be implemented according to embodiments of the present disclosure. The embodiment of the vehicle platform 200 illustrated in FIG. 2 is for illustration and explanation only. FIG. 2 does not limit the scope of this disclosure to any particular implementation of a vehicle platform.

According to embodiments of this disclosure, a vehicle platform 200 includes a base frame 205. The base frame 205 can include coupling mounts configured to connect wheels 210 to the base frame 205. In some embodiments, the base frame 205 includes a battery pack 215 integrated therein. The vehicle platform 200 includes one or more electric drivetrain units, such as a rear drivetrain unit (RDU) 220 and a front drivetrain unit (FDU) 225.

The base frame 205 can be made of any suitable material, such as carbon steel, aluminum alloys, and the like. The base frame 205 includes one or more rails 230 that extend laterally along a length of the vehicle platform 200. The rails 230 are configured to form lateral edges of a battery compartment or battery containment unit. The base frame 205 can further include one or more panels 235 configured to extend horizontally on top and bottom portions of the rails 230. In certain embodiments, the rails 230 and panels are configured to form the battery compartment integrated into the base frame 205. The battery compartment is further configured to house the components of the battery pack 215.

In certain embodiments, the base frame 205 includes a charger. The charger is coupled to a charging port, which is configured to be selectively coupled to an external power source, such as a wall socket, or electric power connector. The charger can receive alternating current (AC) electrical energy and convert the AC electrical energy into a direct current (DC) electrical energy to charge the battery pack 115.

Although FIG. 2 illustrates one example of a vehicle platform 200, various changes may be made to FIG. 2. For example, the vehicle platform 200 could include any number of each component in any suitable arrangement. In general, vehicle systems come in a wide variety of configurations, and FIG. 2 does not limit the scope of this disclosure to any particular configuration. Also, while FIG. 2 illustrates one vehicular configuration in which various features disclosed in this patent document can be used, these features could be used in any other suitable system.

Figure 3:
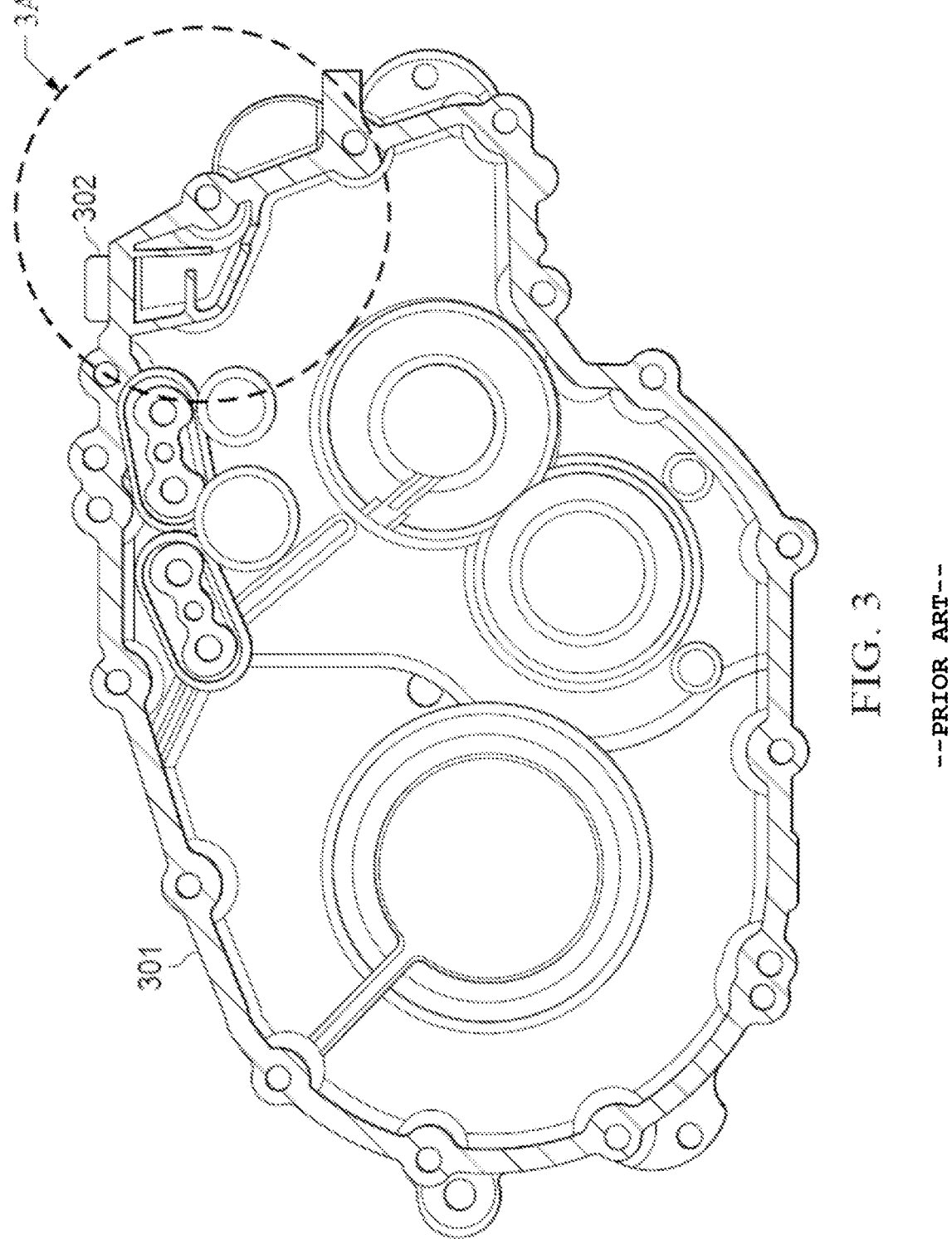
FIGS. 3, 3A, and 3B illustrate a drive unit venting design in accordance with the prior art.
Figures 3A, 3B:
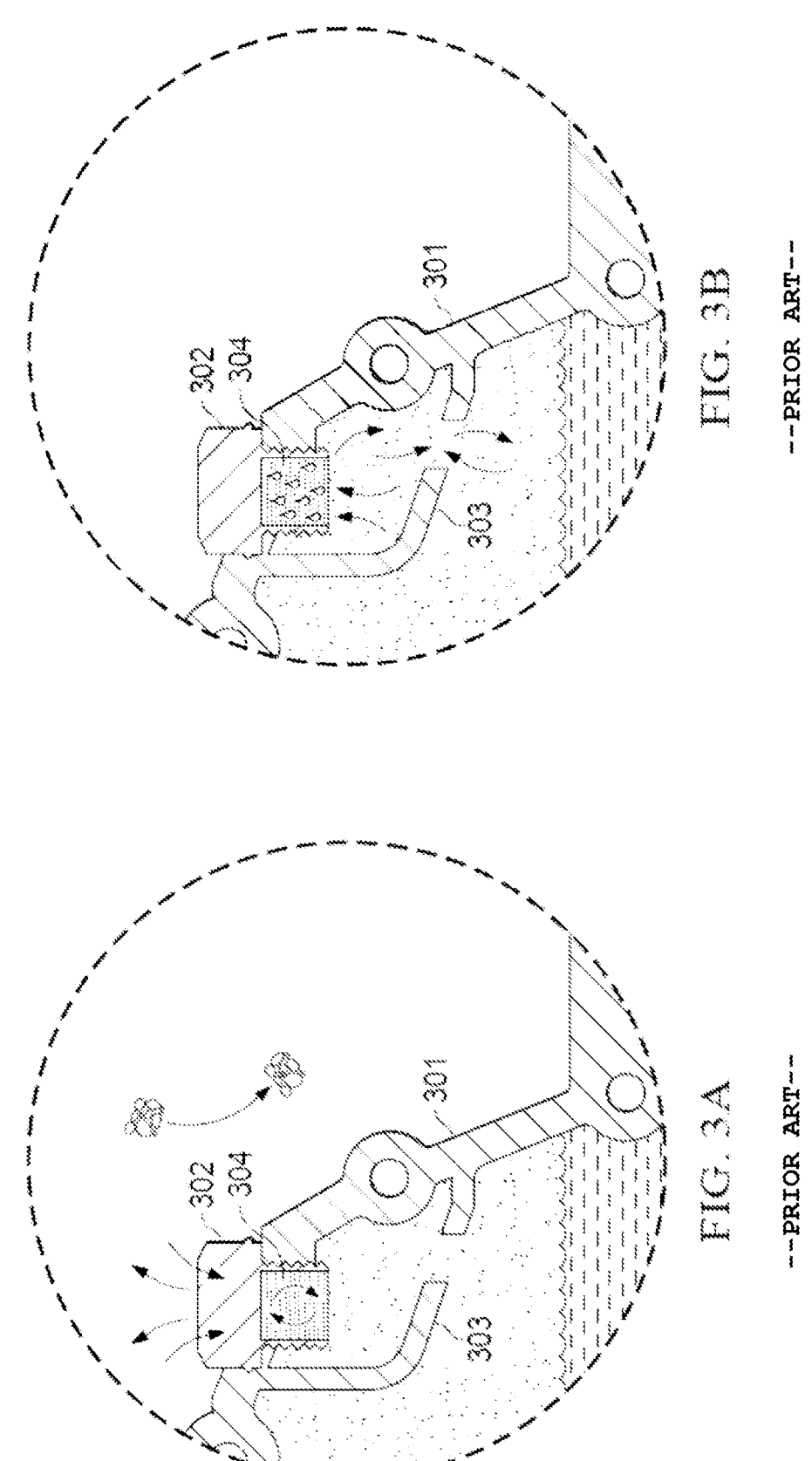

FIGS. 3, 3A, and 3B illustrate a drive unit venting design. FIG. 3 is a sectional view of the drive unit housing 301, while FIGS. 3A and 3B are alternative enlargements of a portion of FIG. 3 under different circumstances. In the drive unit venting design illustrated, a vent opening through the drive unit housing 301 receives a vent plug 302. The vent plug 302 includes longitudinal openings therethrough (not shown in FIGS. 3, 3A and 3B) and a permeable membrane 304 through which air permeates to equalize pressure between the interior cavity of the drive unit housing 301 and the exterior. FIG. 3A illustrates the circumstance when the permeable membrane 304 is not saturated. As illustrated in FIG. 3A, the permeable membrane 304 of the vent plug 302 allows pressure equalization while blocking external contaminants from entering the interior cavity. FIG. 3B illustrates the circumstance when the permeable membrane 304 is saturated. As illustrated in FIG. 3B, the permeable membrane 304 of the vent plug 302 allows at least some pressure equalization (although with less efficacy), and generally also keeps liquid and aerosol droplets of fluid from escaping the internal cavity of the drive unit housing 301. When the permeable membrane 304 is saturated, however, some aerosol fluid may escape and coalesce on external surfaces of the drive unit housing 301.

FIGS. 3A and 3B are typical of most vent unit designs. Most vents are connected to the main housing cavity with nothing blocking the permeable membrane from direct fluid exposure. Some vents are connected in the same way, but include a hose extending the vent membrane further above the fording depth.

Figure 4B:
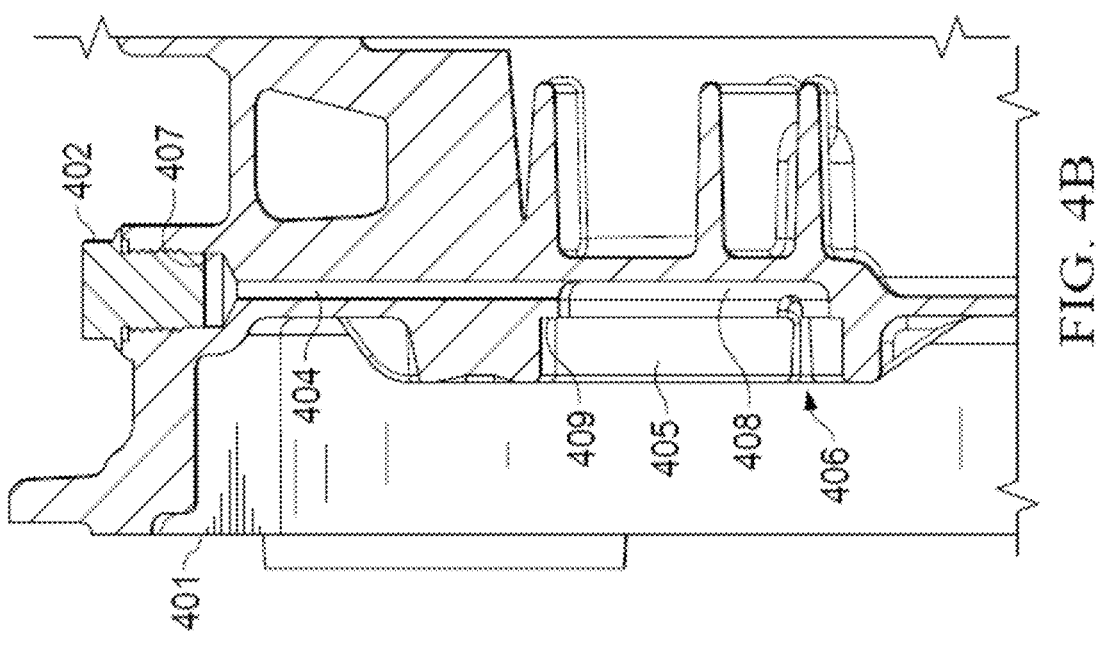
FIGS. 4A, 4B, and 4C depict a drive unit venting design according to embodiments of the present disclosure is depicted.
Figure 4A:
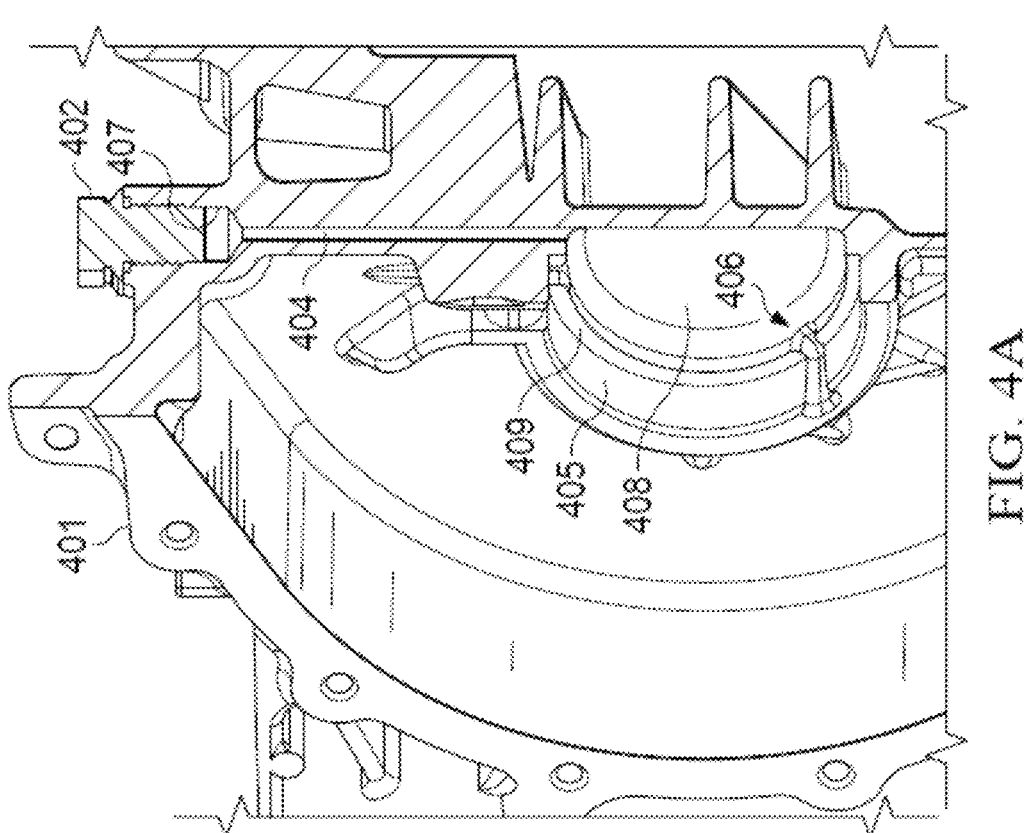
Figure 4C:
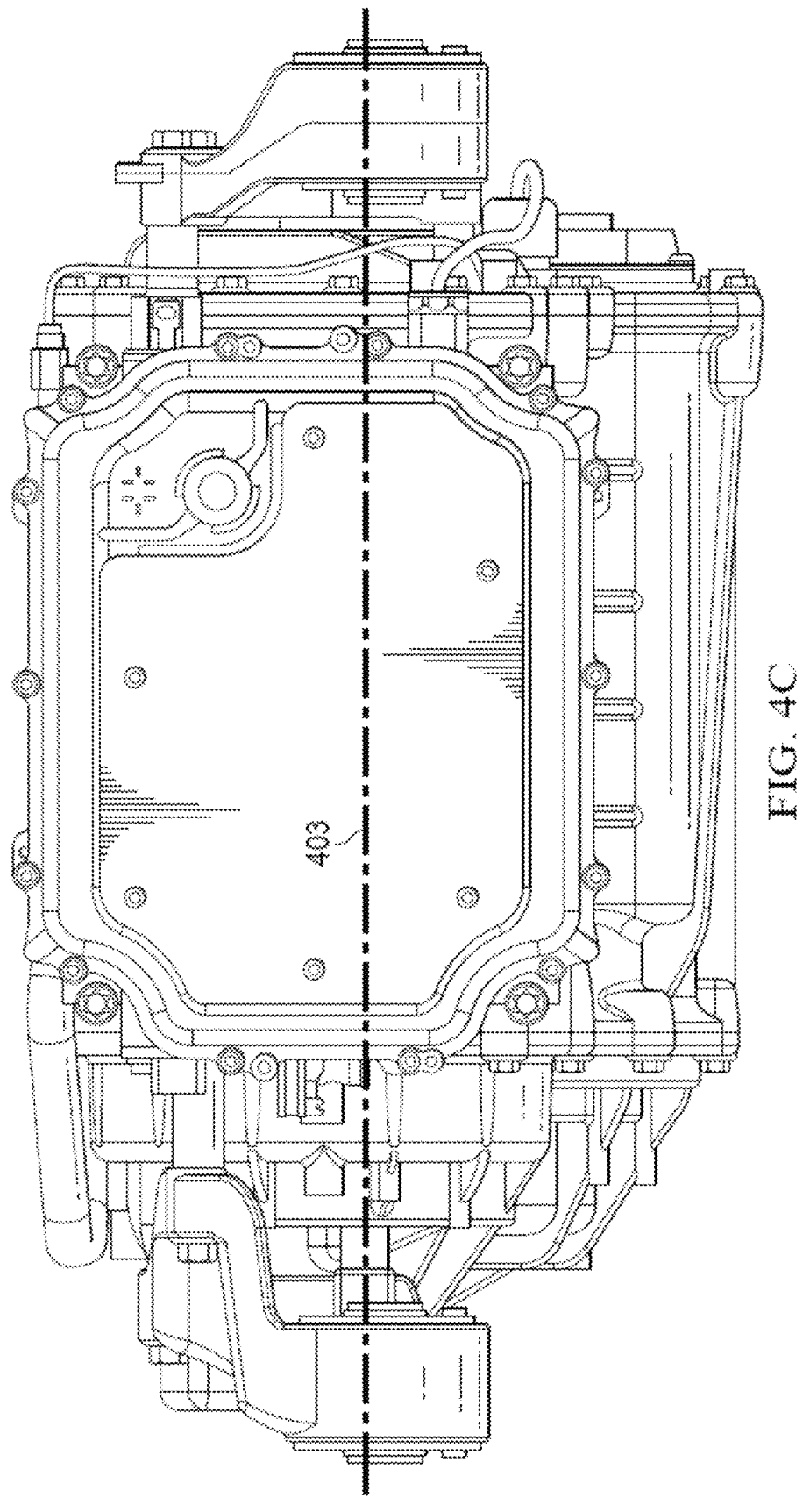

Referring to FIGS. 4A, 4B, and 4C, a drive unit venting design according to embodiments of the present disclosure is depicted. The embodiment illustrated in FIGS. 4A, 4B, and 4C is for illustration and explanation only. FIGS. 4A, 4B, and 4C do not limit the scope of this disclosure to any particular implementation of drive unit venting.

FIG. 4A is a perspective, partially sectional view of a motor housing 401 and vent plug 402, taken transverse to a longitudinal axis 403 of a drive unit as shown in FIG. 4C, while FIG. 4B is a side sectional view. The vent plug 402 includes openings and a permeable membrane as described above in connection with FIGS. 3A and 3B. The vent plug 402 is screwed or pressed in place within a receptacle 407 that is located, axially or along a long dimension of the motor housing 401, behind the intermediate shaft bearing cup, within which the end of the shaft is received when the motor is mounted within the motor housing 401. (For a motor housing 401 including an end portion, the receptacle for the vent plug 402 may be situated in the end portion.) The shaft bearing cup is substantially cylindrical, with a depth corresponding to a portion of the end of the motor to be received therein. A recess 408 of a smaller diameter, leaving a lip 409 around a bottom of the shaft bearing cup, extends into the end wall of the motor housing 401.

The receptacle for the vent plug 402 opens to an exterior of the motor housing 401 and is connected by a long tubular venting duct 404, which is integrated into the motor housing 401, to an opening within the shaft bearing cup located behind the bearing bore 405—that is, the venting duct 404 opens into the smaller-diameter recess 408 at the bottom of the shaft bearing cup, defined by the lip 409 around the shaft bearing cup. The location for the end opening of the venting duct 404 is therefore proximate to a central point along the main axis of rotation, where fluid typically does not reach. The location of the recess 408 at the bottom of the shaft bearing cup, behind the central bearing for the motor, prevents fluid from entering the venting duct 404 upon rotation of the drive unit housing 401 from an upright position to an inverted position, since the fluid fills the main cavity in the motor housing 401 to a level below the bearing bore and remains below that level for all orientations as the drive unit housing 401 as rotated around the primary (long) axis of the drive unit. Additionally, exposure to fluid vapor is minimized due to the intermediate shaft creating a form of labyrinth seal when installed with the bearing.

While the venting duct 404 is shown in FIGS. 4A and 4B as straight, a labyrinthine form may be used instead. The path of the labyrinth may include multiple turns, effectively increasing the length of the path of the venting duct 404 and decreasing the ability of internal or external fluid to enter or escape. Moreover, the venting duct need not be integrally formed on the wall of the drive unit housing 401 as shown in FIGS. 4A and 4B. Rather, the venting duct could be in the form, for example, of tubing (plastic, etc.) secured within the main cavity.

Figure 5:
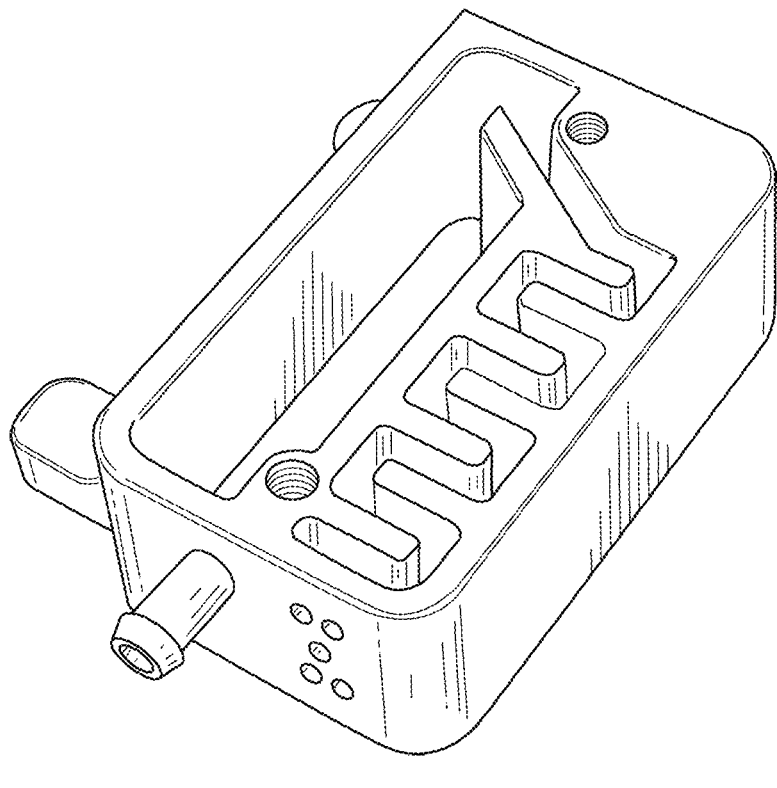
FIG. 5 illustrates a breather box suitable for use with a venting duct according to embodiments of the present disclosure.

While the example of FIGS. 4A through 4C utilizes a vent plug 402, in alternative embodiments the design may utilize a breather box (not including a membrane) installed within the receptacle. FIG. 5 illustrates a breather box suitable for use with a venting duct according to embodiments of the present disclosure. As apparent, the breather box includes a fluid trap and a labyrinthine air flow path.

Although described in connection with a drive unit, the vent design of the present disclosure may be used with any enclosure for rotating components, such as a gearbox, transmission, etc., that contains fluid and also requires venting. Furthermore, while described in the exemplary embodiment as opening into the bearing bore of the main cavity for the drive unit housing 401, the venting duct may open into another portion of the main cavity, such as proximate to a resolver, on the gearbox side, etc., depending on available space within the drive unit design.

To the extent that fluid does reach an area at which the end opening for the venting duct 404 is located, drain cutouts 406 are provided to drain fluid back into the main cavity. The design therefore eliminates the need for temporary vent plug parts during assembly. The solution is fully integrated to the motor housing and reduces exposure of vent to fluid and vapor that could damage and reduce the functionality of the vent.

Locating the end opening of the venting duct 405 near the main axis of rotation allows the flow of gas to equalize the pressure inside the drive unit with the external pressure, which is especially important during cold start, under high-g loads, and when driving across rough terrain. Such a design limits vent exposure to damaging fluid aerosol and splashing, including splashing from gears. The vent design also allows rotation/inversion of drive unit without the vent being exposed to fluid, and without an additional plug component that must be changed during assembly.

It may be advantageous to set forth definitions of certain words and phrases used throughout this patent document. The terms "include" and "comprise," as well as derivatives thereof, mean inclusion without limitation. The term "or" is inclusive, meaning and/or. The phrase "associated with," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, have a relationship to or with, or the like. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

The description in the present disclosure should not be read as implying that any particular element, step, or function is an essential or critical element that must be included in the claim scope. The scope of patented subject matter is defined only by the allowed claims. Moreover, none of the claims invokes 35 U.S.C. § 112(f) with respect to any of the appended claims or claim elements unless the exact words "means for" or "step for" are explicitly used in the particular claim, followed by a participle phrase identifying a function. Use of terms such as (but not limited to) "mechanism," "module," "device," "unit," "component," "element," "member," "apparatus," "machine," "system," "processor," or "controller" within a claim is understood and intended to refer to structures known to those skilled in the relevant art, as further modified or enhanced by the features of the claims themselves, and is not intended to invoke 35 U.S.C. § 112(f).

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. A venting structure, comprising:
a vent receptacle that opens to an exterior of a motor housing, the vent receptacle positioned behind a shaft bearing cup that receives therein a shaft of a motor carried within the motor housing and defines a bearing bore, the motor housing having a main cavity and containing rotating components and fluid;
a vent plug within the vent receptacle, the vent plug comprising a membrane through which air permeates to equalize pressure between the main cavity and the exterior of the motor housing; and
a venting duct integrated within the motor housing and coupling the vent receptable to a recess at a bottom of the shaft bearing cup, the recess having a smaller size relative to the shaft bearing cup and defined by a lip around the bottom of the shaft bearing cup, the recess being proximate to a central point along an axis of rotation of the motor housing so that the fluid does not enter the venting duct upon rotation of the motor housing from an upright position to an inverted position.

2. The venting structure according to claim 1, wherein the recess is recessed relative to a depth of the bearing bore.

3. The venting structure according to claim 1, further comprising:
drain cutouts between the recess and the main cavity, to drain fluid from the recess back into the main cavity.

4. The venting structure according to claim 1, wherein the venting duct has a plurality of turns defining a labyrinthine form.

5. The venting structure according to claim 1, wherein a level of the fluid within the main cavity is below the bearing bore for orientations between and including the motor housing being upright and the motor housing being inverted.

6. The venting structure according to claim 1, wherein the vent plug is screwed or pressed into the vent receptacle.

7. A vehicle including the venting structure according to claim 1, wherein the motor housing is mounted on a chassis for the vehicle, the vehicle further comprising:
wheels rotatably mounted to the chassis; and
a cabin mounted on the chassis.

8. A method of venting a motor housing containing rotating components and fluid, the method comprising:
providing a vent receptacle that opens to an exterior of the motor housing, the vent receptacle positioned behind a shaft bearing cup that receives therein a shaft of a motor carried within the motor housing and defines a bearing bore, the motor housing having a main cavity;
positioning a vent plug within the vent receptacle, the vent plug comprising a membrane through which air permeates to equalize pressure between the main cavity and the exterior of the motor housing; and
connecting a venting duct integrated within the motor housing to couple the vent receptable to a recess at a bottom of the shaft bearing cup, the recess having a smaller size relative to the shaft bearing cup and defined by a lip around the bottom of the shaft bearing cup, the recess being proximate to a central point along an axis of rotation of the motor housing so that the fluid does not enter the venting duct upon rotation of the motor housing from an upright position to an inverted position.

9. The method according to claim 8, wherein the recess is recessed relative to a depth of the bearing bore.

10. The method according to claim 8, further comprising:
providing drain cutouts between the recess and the main cavity, to drain fluid from the recess back into the main cavity.

11. The method according to claim 8, wherein the venting duct has a plurality of turns defining a labyrinthine form.

12. The method according to claim 8, wherein a level of the fluid within the main cavity is below the bearing bore for orientations between and including the motor housing being upright and the motor housing being inverted.

13. The method according to claim 8, wherein the vent plug is screwed or pressed into the vent receptacle.

14. The method according to claim 8, wherein the motor housing is mounted on a chassis for a vehicle, the method further comprising:
mounting wheels to the chassis; and
mounting a cabin on the chassis.

* * * * *